United States Patent Office 2,918,624
Patented Dec. 22, 1959

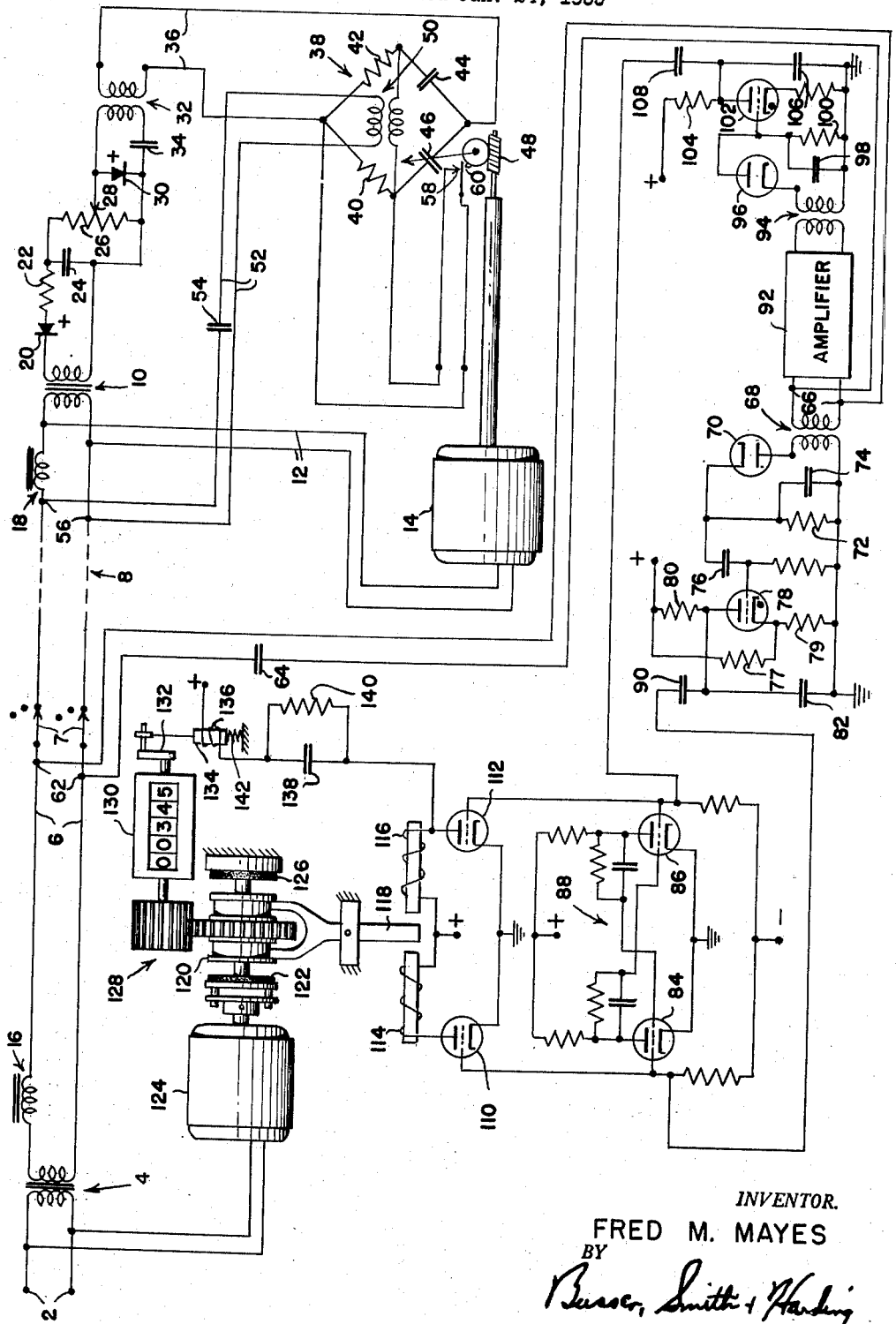

2,918,624
IMPEDANCE MEASURING DEVICE

Fred M. Mayes, Newton Square, Pa., assignor to Sun Oil Company, Philadelphia, Pa., a corporation of New Jersey Application January 24, 1955, Serial No. 483,736

6 Claims. (Cl. 324—60)

This invention relates to an impedance measuring device and has particular reference to the measurement of impedances under conditions essentially eliminating the effects of long connecting cables between a sensing unit and a measuring or recording unit.

As will appear hereafter, the word "measurement" is used in a quite broad sense, not limited to the ascertainment of numerical values, but including the production of outputs which are functionally related to the impedance and utilized for observation, recording, control, or like purposes. For simplicity in describing the invention, reference will be primarily made to measurements of small capacitances or small changes in capacitances though it will become evident that the invention is equally applicable to the measurement of impedances and small changes in impedances quite generally.

Numerous occasions arise for the measurement of capacitances but, in general, it has been necessary to associate closely with the capacitances to be measured electronic apparatus which gives rise to signals which are functions of the capacitances. For example, it has been recognized that an ideal method for measuring very small capacitances or changes in capacitances involved the utilization of the capacitance undergoing measurement as a tuning element of an oscillator, whereby high sensitivity is secured by producing beats susceptible to detection and measurement. In other cases, capacitances have been measured by their incorporation in bridges or other circuits which are activated by alternating currents. In particular, troubles have arisen where the measurement of capacitance requires remote connection. Such connection will generally introduce a capacitance of its own which is so large that minor changes due to temperatures or mechanical displacements will cause variations in capacitance which may be much greater than the variations requiring measurement. For example, a coaxial cable may have a distributed capacitance of about 50 micromicrofarads per foot. Yet the changes in capacitance which it may be desired to measure may be of the order of less than one micromicrofarad which, for a cable of such length as may be ordinarily required, will represent only a very small fraction of the total distributed capacitance of the cable, with the result that even minor temperature changes may produce corresponding changes in the cable capacitance completely masking the changes to be detected. The general object of the present invention is the provision of methods and apparatus for making impedance measurements while practically eliminating any effects of capacitance or other impedance changes in a connecting cable or the like. In accordance with the invention, remote measurements may be made without the presence of any vacuum tubes or other bulky or mechanically- or temperature-sensitive apparatus adjacent to the capacitance to be measured and, as will become more apparent hereafter, it is possible to utilize a single measuring apparatus with a plurality of cables running to impedances to be measured with the possibility of switching from one to the other without the necessity for making adjustments to compensate for the connecting lines. This independence of connections is of major advantage in the making of field measurements where lengths and dispositions of cables, or the like, are subject to quite arbitrary variation.

The objects of the invention relate generally to the attainment of results such as described above, and the broad objects as well as specific objects particularly relating to details of apparatus and operation will become apparent from the following description, read in conjunction with the accompanying drawing, in which the figure is a wiring diagram showing one form of apparatus provided in accordance with the invention.

Alternating current which may be at commercial supply frequency is provided to the apparatus at terminals 2. This current is supplied through transformer 4 and a choke 16 to a line 6 located at a central station at which the major part of the apparatus illustrated is located. The line 6 may be selectively connected through switching means indicated at 7 to any one of a number of connecting lines 8 running to remote installations, the remoteness being indicated by the dashed lines. Only one of these remote installations is indicated, it being understood that similar remote installations may be selectively connected to the line 6 by manipulation of the switching means. The lines 8 illustrated are connected to the primary of a transformer 10 with isolation therefrom by a choke 18. The isolation effected by the chokes 16 and 18 is to keep signal frequencies hereafter referred to from reaching the transformers 8 and 10 and the connections 12 to a motor 14 which may be of synchronous type if alternating current is used. As will become evident from the following description of operation, the power supplied may be direct, in which case various obvious modifications would be made. For consistency of description, however, it will be assumed that the power supply is of alternating current at commercial frequency. The secondary of the transformer 10 is connected to rectifier arrangement comprising a diode 20, a resistor 22 and a filter capacitance 24. Supplied with direct current from this rectifier is a germanium diode crystal oscillator comprising a potentiometer 26 having its adjustable contact 28 connected to the anode of a crystal diode 30, the cathode of which is connected to one end of the potentiometer while the diode is shunted by the primary of a transformer 32 and a capacitance 34 providing a tuned circuit supplying relatively high frequency output from the secondary of transformer 32 to the connections 36. While other oscillators may be used, the oscillator thus provided is extremely simple and compact and utilizes the known properties of a germanium crystal diode to act as an oscillator when fed from a relatively high potential applied in the inverse direction to the diode. It will be noted from the circuit arrangement that a negative potential is applied from the rectifier to the anode of the diode. The particular potential to be applied to secure oscillation depends upon the characteristics of the particular crystal and is subject to adjustment by the potentiometer contact 28. The D.C. filtering arrangement used is adquate since a ripple at supply frequency is not objectionable, the measuring bridge operating on a null basis as will become apparent.

Connections 36 supply the exciting current at relatively high frequency, for example of the order of several kilocycles, to a bridge indicated at 38 which comprises resistors 40 and 42 together with capacitances 44 and 46. Resistors 40 and 42 may be equal, in which case the bridge is balanced when the capacitances 44 and 46 are equal. Alternatively, the resistors may bear a particular ratio to each other, in which case balance occurs upon the existence of a corresponding ratio of the capacitances.

For simplicity of description, it may be consistently assumed hereafter that the resistors 40 and 42 are equal.

The capacitance 44 is the one to be measured. This capacitance may take numerous physical forms. If level of a non-conducting liquid is to be measured, the capacitance 44 may be constituted by a pair of conductors between which the liquid level rises. In such case, the capacitance 44 will be a measure of liquid level. If an aqueous or other conducting liquid is to have its level measured, the liquid itself may provide one plate of the capacitance, the other being constituted by a conductor extending downwardly through the liquid surface and surrounded by a dielectric such as a plastic coating. If dielectric constant measurements are being made of liquids or solid materials, such materials may be passed between fixed conducting plates to constitute the capacitance. If mechanical displacements are to be determined, the plates of the capacitance may be moved relatively to each other in accordance with the displacement. These examples will suffice to indicate the great generality of measurement which is possible, the capacitance 44 being of a great variety of possible forms.

In the preferred embodiment of the invention, the capacitance 46 is a precision variable capacitor which is driven through reduction gearing 48 from the shaft of the constantly rotating motor 14. The motor 14 rotates at constant speed and if the supply is alternating it is desirably a synchronous motor. In the case of a direct supply, this may be a constant speed direct current motor.

The output from the bridge is delivered through transformer 50 to the lines 52 including the capacitance 54 which serves to block from the bridge the power supply current while passing the high frequency output signals from the bridge to the terminals 56 of the lines 8.

A switch 58 is shunted across the bridge resistor 40 and is arranged to be momentarily closed by a cam 60 for each cycle of revolution of the precision capacitance 46. Desirably, the switch 58 is arranged for quick make at an accurately controlled position of the capacitor. For purposes of explanation, it may be assumed that the contact at 58 is closed when the capacitor 46 passes in its rotation through its position of minimum capacitance, though this is not necessarily the case so long as the contact takes place at a known value of the capacitance so that a fixed calibration may be secured.

At the central location there is taken from the terminals 62 along the line 6 an output through the isolating condenser 64 to the input terminals 66 of a transformer 68 and an amplifier 92. The capacitance 64 is small so as to block the power supply frequency while passing the signal frequency from the bridge. The transformer 68 supplies its output through diode 70 and the arrangement of resistor 72 and capacitors 74 and 76 to the control grid of a thyratron 78 provided with an anode load resistor 80. Ordinarily, this thyratron 78 is biased by the arrangement of resistors 77 and 79 connected between the positive supply terminal and ground so as to be held in a cut-off condition for the normal bridge output signals presented through transformer 68 and diode 70 to its grid. However, when the switch 58 is closed, the bridge is unbalanced to an extreme degree so as to provide a very large output which through the diode 70 will supply a large positive potential to the thyratron grid causing it to fire. The load resistor 80 and capacitance 82 are so chosen that the thyratron will normally pulse when its grid is at firing potential with respect to its cathode, so that after firing the thyratron will restore repeatedly to its un-ionized condition and will maintain that condition when the large signal resulting from the short circuiting of resistor 40 is removed.

The output from the anode of the thyratron 78 is delivered to one input terminal of a bistable multivibrator 88 comprising the triodes 84 and 86 in conventional connections.

The terminals 66 deliver the output of the bridge to the amplifier 92 the output of which is delivered through transformer 94 and the arrangement of diode 96, capacitor 98 and resistor 100 to the control grid of a second thyratron 102 which is connected in a circuit similar to that of thyratron 78 and comprising the anode load resistor 104 and capacitor 106. In this case, the cathode of the thyratron 102 is connected to ground and the thyratron is of a type which will fire when the negative bias applied to its control grid approaches ground potential. However, so long as the bridge is unbalanced, the large output from the amplifier will supply through the diode 96 a high negative biasing potential to the thyratron grid preventing firing. Only when the bridge is substantially in balance so that the signal input at terminals 66 is substantially zero is this bias removed to provide firing of the thyratron. The anode of the thyratron is connected through capacitor 108 to the other input terminal of the multivibrator 88.

The multivibrator 88 operates in the usual fashion with one or the other of triodes 84 and 86 always highly conducting with the companion triode then cut off. To provide an operating output from the multivibrator, the grids of the triodes 84 and 86 are connected respectively to the grids of power triodes 110 and 112 in the anode circuits of which there are located the solenoids 114 and 116, respectively arranged to move toward the left or the right the operating lever 118 of a clutch member 120. This clutch member 120 when moved toward the left by sliding freely on the shaft of motor 124 will engage the clutch face 122 carried by the motor shaft. When moved in the opposite direction, it engages a fixed friction facing 126 to bring the clutch member quickly to rest. The clutch member 120 is connected through gearing 128 to the drive shaft of a counter 130 which is of a type arranged to be reset to zero upon the rocking of a lever 132 connected to the plunger 134 operated by a solenoid 136 which is in a circuit running from a positive supply terminal to the anode of triode 112 and including the parallel arrangement of a capacitor 138 and a resistor 140.

The operation of the apparatus may now be described.

The synchronous or other motors 14 and 124 continuously operate at the same speed or at speeds which have a fixed ratio to each other. Assuming as a starting condition the closing of the contact at 58 short circuiting the resistor 40, a large signal at signal frequency is emitted from the bridge and is applied through connections 52 and 8 to the terminals 66 producing a firing potential at the grid of thyratron 78 thereby providing a negative pulse through capacitor 90 to the grid of triode 84, cutting off this triode which was previously conducting, and rendering conductive the triode 86. The result is simultaneous conduction of triode 112 to energize the solenoids 116 and 136, the latter being momentarily energized by the surge of current through capacitor 138, the normal flow of current through resistor 140 being insufficient to energize the solenoid 136 to an extent producing attraction of its plunger 134. The plunger 134, accordingly, imparts a pull to the lever 132 zeroizing the counter 130, the lever then being restored to its normal condition by spring 142. The action of solenoid 116, which continues through the period of conductivity of triode 112, engages the clutch member 120 with the driven clutch face 122 thereby starting rotation of the driving shaft of the counter 130. The contact at 58 then opens and the output of the bridge is then dependent upon the relative values of the capacitances at 44 and 46. The capacitance at 46 then advances from its zero position, changing capacitance toward that of the condenser 44 which is to be measured. So long as the capacitances are different, the bridge provides an output signal at the terminals 66 which, after the opening of contact at 58, is insufficient to provide a firing potential at the grid of thyratron 78 but provides through the output of the amplifier 92 a very large signal which will maintain the grid of thyratron 102 at cut-off condition. As the capacitance at 46 varies, the counter 130 accumulates a reading which is proportional to its change of capacitance. Desirably, the indication of the counter 130 is linear with respect to the change of capacitance involved. As the capacitances approach equality, the output of the bridge decreases and when substantial equality is reached, it is reduced to such extent that the negative bias applied to the thyratron 102 is no longer sufficient to prevent firing and this thyratron then fires. By the utilization of sufficient amplification in amplifier 92, firing may be caused to occur only when the capacitances are very close to equality. When firing occurs, a negative signal is applied to triode 86 cutting off this triode and rendering triode 84 conductive. As a result, solenoid 116 is deenergized and solenoid 114 immediately energized to shift clutch member 120 to the right against the fixed clutch facing 126 thereby sharply arresting the advance of the counter 130. The counter 130 accordingly indicates by the number presented thereon the capacitance at 46 which is substantially equal to the capacitance at 44. The arrested condition of the counter 130 continues until the cycle of change of capacitance 46 is completed and contact is again made at 58, whereupon the counter 130 is zeroized and the cycle repeats.

As noted heretofore, the switching arrangement at 7 may connect other remote installations to the central apparatus so that various capacitances such as 44 may be serially determined.

It may be noted that the apparatus at the remote installation may be very small, since all of the elements thereof, including the oscillator, power supply arrangement, bridge and motor, may be physically small. The remote installation is also quite inexpensive. Since a null indication is involved, it will be evident that the cable connection at 8 plays no part in interfering with the accurate measurement of the capacitance. Accordingly, temperature changes or changes in the physical condition of the cable may be disregarded and there is no requirement for recalibration in passing from one cable to another in switching the readings to different remote installations.

It will be evident that the capacitances at 44 and 46 may be replaced by other impedances. Either, for example, may well consist of an inductance or resistance or various combinations of elements. In fact, if a resistance is to be measured, it may be located at 42 and balance may be effected by varying a capacitance such as 46 in relation to a fixed capacitance at 44. Various other bridge or similar impedance balancing arrangements may also be used providing that they give a null signal for measurement or a null signal in the vicinity of measurement.

There have been described an entirely automatic apparatus operating on a null principle, but there may be utilized in accordance with the invention a simpler non-automatic system which involves merely operation in the vicinity of a null condition of a bridge or equivalent. Assuming, for example, that the capacitance 46 is maintained constant and that capacitance 44 which is to be measured varies through capacitance values approximating the value at 46, the output of the bridge will be substantially linear and its output may be rectified to give readings on a direct current meter. In this fashion, a substantial range of capacitance may be measured to a reasonably high degree of accuracy and without substantial interference by capacitance or other changes in a connecting cable to a central reading or recording location.

It will be clear that various details of construction and operation may be modified without departing from the invention as defined in the following claims.

What is claimed is:

1. An apparatus comprising two spaced stations connected by a transmission line, means at a first of said stations for connecting a source of power to said transmission line for delivery of power over said transmission line to the second of said stations, said second station comprising a circuit including a pair of impedances, one of which is arbitrarily variable, driving means for varying periodically the other one of said impedances and means delivering to said transmission line for delivery from said second station to said first station an output signal responding to variations of said other impedance, said first station including driving means operating synchronously with the first mentioned driving means, means initiating operation of said second driving means at a particular phase of the aforementioned period, and means terminating operation of said second driving means approximately at the phase of said period at which a minimum value of output occurs.

2. An apparatus comprising two spaced stations connected by a transmission line, means at a first of said stations for connecting a source of power to said transmission line for delivery of power over said transmission line to the second of said stations, said second station comprising a circuit including a pair of impedances one of which is arbitrarily variable, driving means for varying periodically the other one of said impedances and means delivering to said transmission line for delivery from said second station to said first station an output signal which is minimum when said impedances bear a predetermined relationship to each other, said first station including driving means operating synchronously with the first mentioned driving means, means initiating operation of said second driving means at a particular phase of the aforementioned period, means terminating operation of said driving means at the phase of said period at which said minimum value of output approximately occurs, and means positioned by said second driving means for indicating the phase of the period at which said minimum value of output approximately occurs.

3. An apparatus comprising two spaced stations connected by a single transmission line, means at a first of said stations for connecting a source of power to said single transmission line for delivery of power over the latter to the second of said stations, said second station comprising a circuit including a pair of impedances one of which is arbitrarily variable, driving means for varying periodically the other of said impedances at a controlled rate, means for delivering to said single transmission line for delivery from said second station to said first station a pulse indicating commencement of operation of said driving means, and means delivering to said transmission line for delivery from said second station to said first station a signal responding to variations of said other impedance, and indicating means at said first station commencing operation in response to said pulse and terminating operation in response to the minimum signal delivered.

4. An apparatus comprising two spaced stations connected by a transmission line, means at a first of said stations for connecting a source of power to said transmission line for delivery of power over said transmission line to the second of said stations, said second station comprising a balanceable circuit including a pair of impedances and of a type providing an output which is a function of the relationship of said impedances and which has a minimum value when said impedances bear a predetermined relationship to each other to balance said circuit, one of said impedances being arbitrarily variable, means driven by power delivered through said transmission line for varying periodically at a controlled rate the other of said impedances, and means delivering said output to said transmission line for delivery from said second station to the first station, and means at said first station responsive to values of said output approximating its minimum value.

5. An apparatus comprising two spaced stations connected by a transmission line, means at a first of said stations for connecting a source of power to said transmission line for delivery of power over said transmission line to the second of said stations, said second station comprising a balanceable circuit including a pair of impedances and of a type providing an output which is a function of the relationship of said impedances and which has a minimum value when said impedances bear a predetermined relationship to each other to balance said circuit, one of said impedances being arbitrarily variable, means driven by power delivered through said transmission line for varying periodically at a controlled rate the other of said impedances, and means delivering said output to said transmission line for delivery from said second station to the first station, and means at said first station responsive to values of said output approximating its minimum value, and means at said first station indicating the phase of the period of variation of the second of said impedances at which an approximate minimum value of said output occurs.

6. An apparatus comprising two spaced stations connected by a transmission line, means at a first of said stations for connecting a source of power to said transmission line for delivery of power over said transmission line to the second of said stations, said second station comprising a balanceable circuit including a pair of impedances and of a type providing an output which is a function of the relationship of said impedances and which has a minimum value when said impedances bear a predetermined relationship to each other to balance said circuit, one of said impedances being arbitrarily variable, means driven by power delivered through said transmission line for varying at a controlled rate the other of said impedances, and means delivering said output to said transmission line for delivery from said second station to the first station, and means at said first station responsive to values of said output approximating its minimum value.

References Cited in the file of this patent

UNITED STATES PATENTS

| | | |
|---|---|---|
| 2,039,405 | Green | May 5, 1936 |
| 2,200,863 | Schuck | May 14, 1940 |
| 2,454,184 | Kliever | Nov. 16, 1948 |
| 2,482,196 | Marye | Sept. 20, 1949 |
| 2,621,233 | Spalding | Dec. 9, 1952 |
| 2,663,867 | Favara | Dec. 22, 1953 |